US009178870B2

(12) United States Patent
Rhee (10) Patent No.: US 9,178,870 B2
(45) Date of Patent: Nov. 3, 2015

(54) USER AUTHENTICATION METHOD USING SELF-SIGNED CERTIFICATE OF WEB SERVER, CLIENT DEVICE AND ELECTRONIC DEVICE INCLUDING WEB SERVER PERFORMING THE SAME

(71) Applicant: Samsung Electronics Co., Ltd., Suwon-si (KR)

(72) Inventor: Hyun Sook Rhee, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 29 days.

(21) Appl. No.: 13/948,524

(22) Filed: Jul. 23, 2013

(65) Prior Publication Data

US 2014/0129828 A1     May 8, 2014

(30) Foreign Application Priority Data

Nov. 8, 2012    (KR) .................. 10-2012-0126168

(51) Int. Cl.
*H04L 29/06*      (2006.01)
*H04L 9/32*       (2006.01)

(52) U.S. Cl.
CPC .......... *H04L 63/0823* (2013.01); *H04L 9/3226* (2013.01); *H04L 9/3263* (2013.01); *H04L 9/3271* (2013.01); *H04L 63/0869* (2013.01); *H04L 63/168* (2013.01)

(58) Field of Classification Search
USPC ........................................................ 713/156
See application file for complete search history.

(56) References Cited

U.S. PATENT DOCUMENTS

| 6,085,320 | A | 7/2000 | Kaliski, Jr. |
| 7,844,816 | B2 * | 11/2010 | Karchov ................. 713/156 |
| 8,838,668 | B2 * | 9/2014 | Eisner et al. ............ 709/201 |
| 2002/0038420 | A1 | 3/2002 | Collins et al. |
| 2012/0036364 | A1 * | 2/2012 | Yoneda et al. .......... 713/175 |
| 2012/0183139 | A1 * | 7/2012 | Matsuo .................. 380/255 |

FOREIGN PATENT DOCUMENTS

| EP | 1492305 A2 | 12/2004 |
| EP | 1492305 A3 | 8/2006 |

(Continued)

OTHER PUBLICATIONS

Extended European Search Report issued Feb. 24, 2014 in European Patent Application No. 13275233.8.

(Continued)

*Primary Examiner* — Amare F Tabor
(74) *Attorney, Agent, or Firm* — Staas & Halsey LLP (57) ABSTRACT

A user authentication method using a self-signed certificate of a web server includes: receiving a log-in message generated by using a public key registered to the self-signed certificate of the web server from a client device; generating a response message by using the log-in message and a secret key corresponding to the public key; transmitting the generated response message to the client device; receiving a verification value from the client device via a secure socket layer (SSL) channel connected by using the self-signed certificate of the web server from the client device when a reliability of the response message is verified at the client device; verifying a reliability of the log-in message by using the received verification value; and confirming completion of user authentication if the reliability of the log-in message is verified.

23 Claims, 5 Drawing Sheets

(56) References Cited

FOREIGN PATENT DOCUMENTS

| WO | 2010/067433 | 6/2010 |
| WO | 2010/067812 | 6/2010 |
| WO | 2011/019549 | 2/2011 |

OTHER PUBLICATIONS

Tsu-Yang Wu et al., "An efficient user authentication and key exchange protocol for mobile client-server environment", Computer Networks 54, 2010, pp. 1520-1530.

\* cited by examiner

USER AUTHENTICATION METHOD USING SELF-SIGNED CERTIFICATE OF WEB SERVER, CLIENT DEVICE AND ELECTRONIC DEVICE INCLUDING WEB SERVER PERFORMING THE SAME

CROSS-REFERENCE TO RELATED APPLICATIONS

This application claims the priority benefit of Korean Patent Application No. 10-2012-0126168, filed on Nov. 8, 2012, in the Korean Intellectual Property Office, the disclosure of which is incorporated herein in its entirety by reference.

BACKGROUND

1. Field

Embodiments relate to a user authentication method using a self-signed certificate of a web server.

2. Description of the Related Art

In a cloud computing environment, various resources connected to a network may be utilized by a client device connected to the same network.

By building web servers within electronic devices connected to a network, the electronic devices may be accessed and used via a web browser of a client device connected to the same network. In other words, when a user wants to access a desired electronic device, the user may access a web page for controlling the electronic device by inputting a corresponding IP address of the electronic device to a web browser of a client device.

The access of electronic devices via a web browser requires a safe user authentication method for providing services to certified users only. However, it is not easy to embody a safe user authentication method based on hypertext transfer protocol (HTTP) communication. Furthermore, a method of generating HTTPs, which is a reliable channel, by employing a secure socket layer (SSL) in the HTTP communication and transferring authentication information requires to store certifications issued by a certificate authority in respective electronic devices, and thus the costs for issuing the certificates are incurred. Furthermore, although there is an HTTP-based authentication method using a challenge-response protocol, the method is designed by using an unsafe hash function, such as message-digest algorithm 5 (MD5).

SUMMARY

In an aspect of one or more embodiments, there is provided a safe password-based user authentication method using a self-signed certificate of a web server.

In an aspect of one or more embodiments, there is provided a user authentication method using a self-signed certificate of a web server, the user authentication method including receiving a log-in message generated by using a public key registered to the self-signed certificate of the web server from a client device; generating a response message by using the log-in message and a secret key corresponding to the public key; transmitting the generated response message to the client device; receiving a verification value from the client device via a secure socket layer (SSL) channel connected by using the self-signed certificate of the web server from the client device when a reliability of the response message is verified at the client device; verifying a reliability of the log-in message by using the received verification value; and confirming completion of user authentication if the reliability of the log-in message is verified.

The log-in message is generated by using the public key and a user ID and a password input via the client device.

The generating of the response message includes extracting a password registered to the web server in correspondence to the user ID; selecting an arbitrary secret value; and generating the response message by using the extracted password, the secret key, the secret value, and the log-in message.

The response message is transmitted via an HTTP request.

In an aspect of one or more embodiments, there is provided an electronic device having a web server, the electronic device including a communication interface unit to communicate with a client device; a certificate generating unit to generate a self-signed certificate; a response message generating unit to generate a response message by using a secret key corresponding to a public key registered to the self-signed certificate in response to a log-in message received from the client device; a user authentication unit to verify a reliability of the log-in message by using a verification value received from the client device via a secure socket layer (SSL) channel connected by using the self-signed certificate of the web server; a storage unit to store user authentication information; and a control unit to control a user authentication process, wherein, when the log-in message is received from the client device via the communication interface unit, the control unit transmits a response message generated by the response message generating unit to the client device.

The log-in message is generated by using the public key registered to the self-signed certificate of the web server and the user ID and the password input via the client device.

The response message generating unit extracts a password from the storage unit in correspondence to the user ID input via the client device, selects an arbitrary secret value, and generates the response message by using the extracted password, the selected secret value, the secret key, and the log-in message.

The control unit transmits the response message to the client device via an HTTP request.

According to another aspect of one or more embodiments, there is provided at least one computer readable medium storing computer readable instructions to implement methods of embodiments.

BRIEF DESCRIPTION OF THE DRAWINGS

The above and other aspects will become more apparent by describing in detail embodiments thereof with reference to the attached drawings in which.

DETAILED DESCRIPTION

Embodiments will now be described more fully with reference to the accompanying drawings, in which exemplary embodiments of the present general inventive concept are shown.

Figure 1:
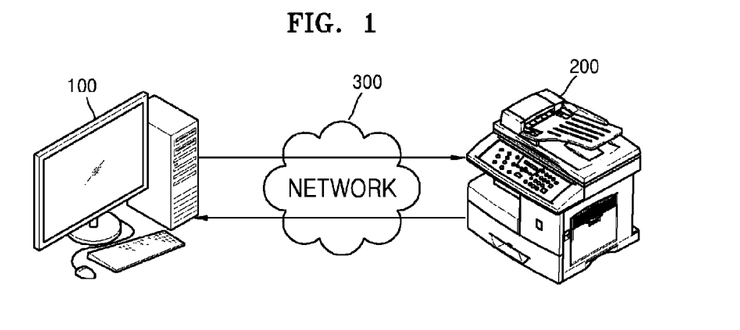
FIG. 1 is a diagram showing an environment for implementing a user authentication method using a self-signed certificate of a web server, according to an embodiment.

FIG. 1 is a diagram showing an environment for implementing a user authentication method using a self-signed certificate of a web server, according to an embodiment.

Referring to FIG. 1, a client device 100 and a multi-function printer (hereinafter referred to MFP) 200 including a web server are connected to a same network 300. Here, although the MFP 200 is shown in FIG. 1 as an example of electronic devices including web servers, other electronic devices, such as a router, may also be used. A user may access the MFP 200 from the client device 100 via the network 300 and control the MFP 200. However, to allow only certified users to access the MFP 200, a user authentication is necessary. When a user inputs user authentication information, that is, a user ID and a password to a web browser on the client device 100, the client device 100 may perform user authentication by communicating with the MFP 200 via the network 300. Detailed description of the user authentication will be described below.

Figure 2:
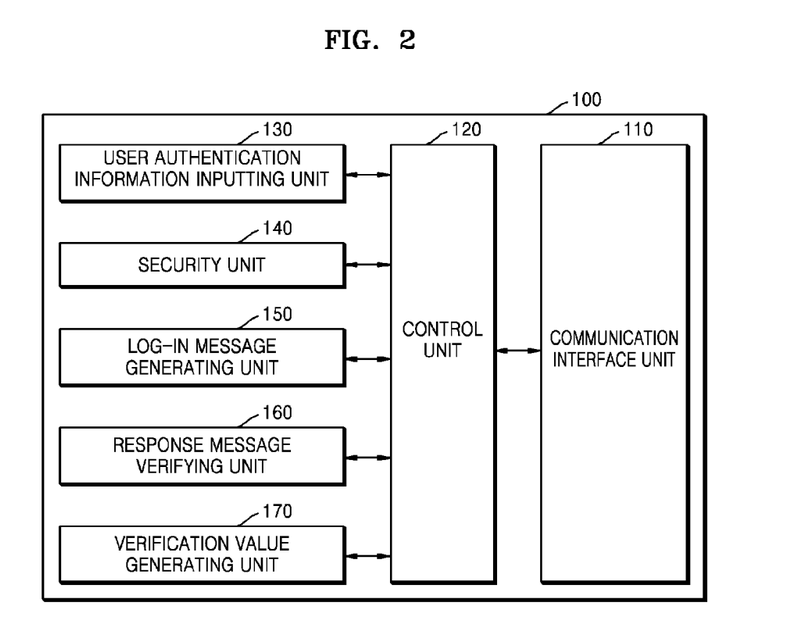
FIG. 2 is a diagram showing the configuration of a client device for performing the user authentication method using a self-signed certificate of a web server, according to an embodiment.

FIG. 2 is a diagram showing the configuration of the client device 100 for performing the user authentication method using a self-signed certificate of a web server, according to an embodiment. Referring to FIG. 2, the client device 100 may include a communication interface unit (communication interface) 110, a control unit (controller) 120, a user authentication information inputting unit 130, a security unit 140, a log-in message generating unit (log-in message generator) 150, a response message verifying unit (response message verifier) 160, and a verification value generating unit (verification value generator) 170. The control unit (controller) 120 may include one or more processors. Operations of the respective components of the client device 100 will be described below in detail with reference to FIG. 4.

Figure 3:
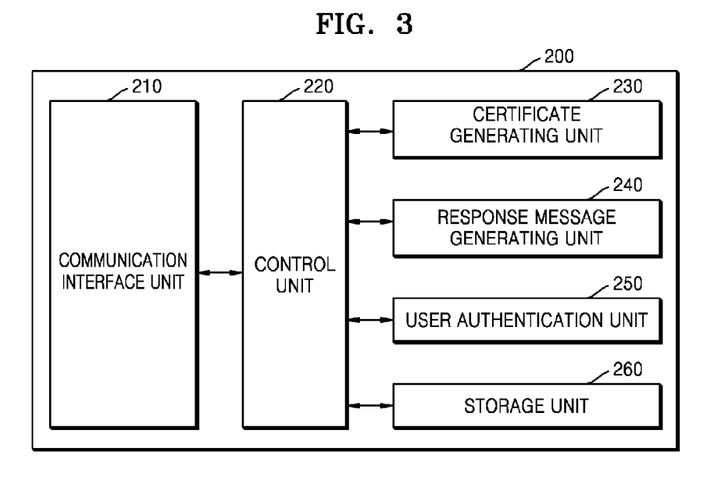
FIG. 3 is a diagram showing the configuration of a MFP including a web server for performing user authentication by using a self-signed certificate of the web server, according to an embodiment.

FIG. 3 is a diagram showing the configuration of the MFP 200 including a web server for performing user authentication by using a self-signed certificate of the web server, according to an embodiment. Referring to FIG. 3, the MFP 200 including a web server may include a communication interface unit (communication interface) 210, a control unit (controller) 220, a certificate generating unit (certificate generator) 230, a response message generating unit (response message generator) 240, a user authentication unit (user authenticator) 250, and a storage unit (storage) 260. The control unit (controller) 220 may include one or more processors. Operations of the respective components of the MFP 200 will be described below in detail with reference to FIG. 4.

Figure 4:
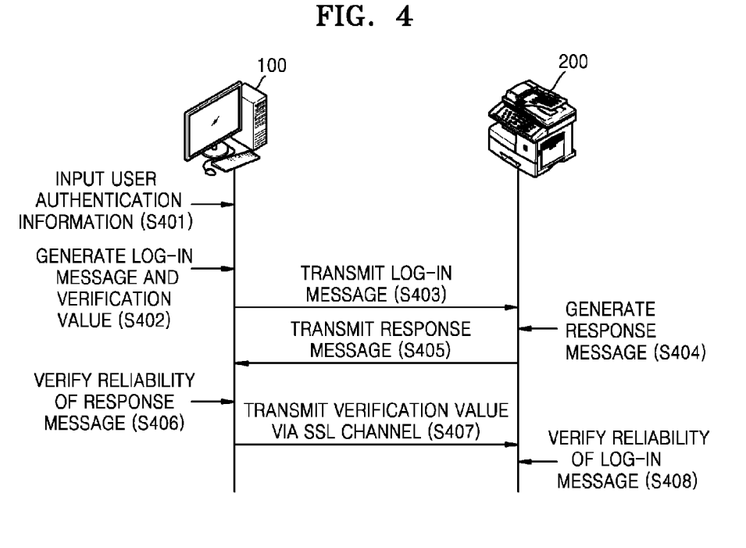
FIG. 4 is a diagram showing operations performed by the client device and the MFP while user authentication is being performed using a self-signed certificate of a web server, according to an embodiment.

FIG. 4 is a diagram showing operations performed by the client device 100 and the MFP 200 while user authentication is being performed using a self-signed certificate of a web server, according to an embodiment.

Hereinafter, a user authentication method using a self-signed certificate of a web server according to an embodiment will be described in detail with reference to FIGS. 2 through 4.

In operation S401, the user authentication information inputting unit 130 of the client device 100 receives inputs of user authentication information including a user ID and a password from a user. When the user authentication information is input, a user authentication process is initiated, and the security unit 140 of the client device 100 obtains a public key from a self-signed certificate generated by the certificate generating unit 230 of the MFP 200.

In operation S402, the log-in message generating unit 150 and the verification value generating unit 170 of the client device 100 respectively generate a log-in message and a verification value by using the public key obtained by the security unit 140 and the user ID and the password input by the user authentication information inputting unit 130.

A method for generating a log-in message "LoginMsg" and a verification value "Verifier" will be described below in detail. It is assumed below that a public key obtained by the security unit 140 is "PK=e_s" and a password is "PW". The log-in message generating unit 150 selects an arbitrary secret value "u" and generates an arbitrary Rivest-Shamir-Adleman (RSA) key pair "(PK', SK')=(e_c, d_c)". Next, a log-in message, e.g., "LoginMsg=[u H(PW)^{d_c}, u^{e_s} H(PW)]= [R_1, R_2]", is generated. Here, H denotes a hash function that a web server included in the MFP 200 and the client device 100 share via a web browser. Furthermore, a verification value, e.g., "Verifier=[verifier_c, verifier_s]=[(u, d_c), e_c]", is generated.

When the log-in message and the verification value are generated in operation S402, the control unit 120 of the client device 100 transmits the generated log-in message to the web server of the MFP 200 via the communication interface unit 110 in operation 403. Here, the log-in message may be transmitted via an HTTP request.

The control unit 220 of the MFP 200 receives the log-in message transmitted from the client device 100 via the communication interface unit 210, forwards the log-in message to the response message generating unit 240, and stores the log-in message in the storage unit 260. When the MFP 200 receives the log-in message, the response message generating unit 240 generates a response message in operation S404 in correspondence to the reception of the log-in message. The response message generating unit 240 extracts a password corresponding to the user ID input by the user authentication information inputting unit 130 from the storage unit 260 and generates a response message by using the extracted password, a secret key corresponding to a public key registered to a self-signed certificate, and the received log-in message.

A method of generating a response message "ReplyMsg" will be described below in detail. It is assumed below that a password corresponding to the user ID is "PW" and a secret key corresponding to a public key registered to a self-signed certificate is "SK=e_s". The response message generating unit 240 selects an arbitrary secret value "v". Next, the response message generating unit 240 obtains "u" according to "u'=R_2^{d_s}/H(PW)^{d_s}" and generates a response message according to "ReplyMsg=[v H(PW)^{d_s}, v R_1/ {R_2^{d_s}/H(PW)^{d_s}}, H(u', v)]=[R_3, R_4, R_5]".

When the response message is generated in operation S404, the control unit 220 of the MFP 200 transmits the generated response message to the client device 100 via the control unit 120 in operation S405. Here, the response message may be transmitted via an HTTP request.

The control unit 120 of the client device 100 receives the response message transmitted from the MFP 200 via the communication interface unit 110 and forwards the received response message to the response message verifying unit 160. In operation S406, the response message verifying unit 160 verifies a reliability of the response message by using the public key obtained by the security unit 140 and the verification value generated by the verification value generating unit 170.

A method of verifying a reliability of a response message will be described below in detail. The response message verifying unit 160 obtains "v" according to "v=R_4/H(PW)^{d_c}" and determines whether a response message satisfies "R_3^{e_s}/H(PW)=(R_4/H(PW)^{d_c})" and "R_5=H(u, v)". If the response message satisfies the conditions, it is determined that the response message is reliable. Otherwise, if the response message fails to satisfy the conditions, it is determined that the response message is not reliable.

If the response message is not reliable, the user authentication process is terminated. However, if the response message is reliable, the control unit 120 of the client device 100 transmits the verification value generated by the verification value generating unit 170 to the MFP 200 via a secure sockets layer (SSL) channel connected by using a self-signed certificate in operation S407.

The control unit 220 of the MFP 200 receives the verification value transmitted by the client device 100 via the communication interface unit 210 and forwards the received verification value to the user authentication unit 250. In operation S408, the user authentication unit 250 verifies a reliability of the log-in message by using the received verification value. If the log-in message is reliable, it is determined that the user authentication is successful. Otherwise, if the log-in message is not reliable, it is determined that the user authentication has failed.

A method of verifying a reliability of a log-in message will be described below in detail. It is determined whether a log-in message satisfies "R_1^{e_c}/H(PW)=(R_2^{d_s}/H(PW)^{d_s})^{d_c}". If the log-in message satisfies the condition, it is determined that the log-in message is reliable. Otherwise, if the log-in message fails to satisfy the condition, it is determined that the log-in message is not reliable.

Figure 5:
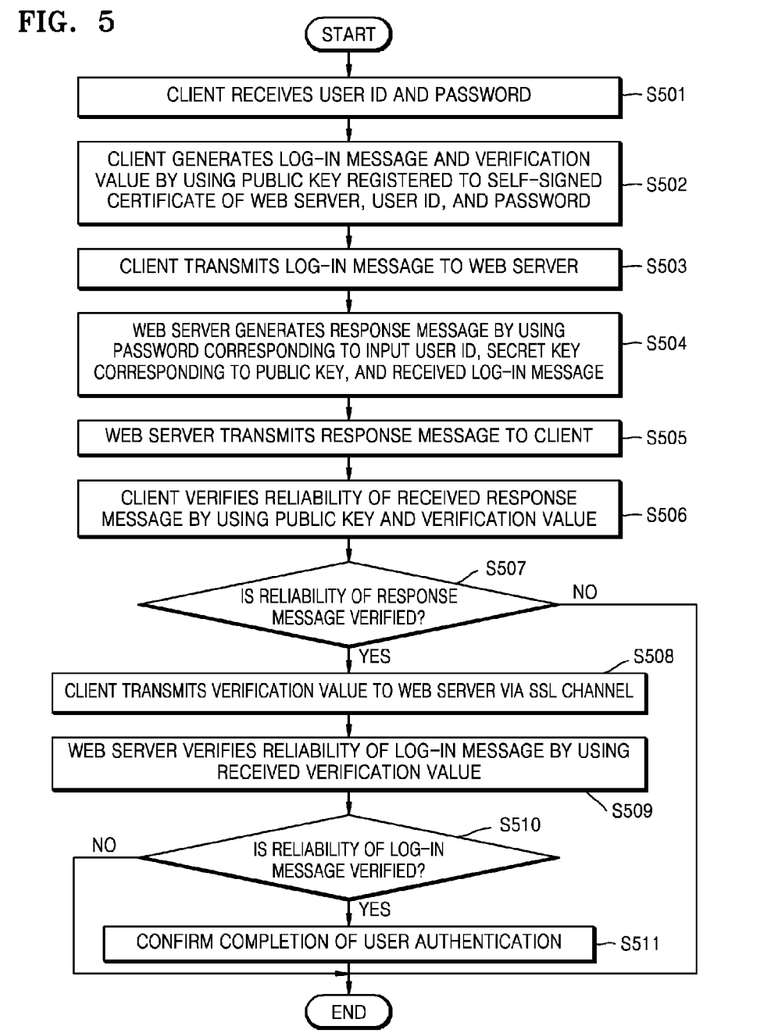
FIGS. 5 through 7 are flowcharts for describing the user authentication method using a self-signed certificate of a web server, according to an embodiment.
Figure 6:
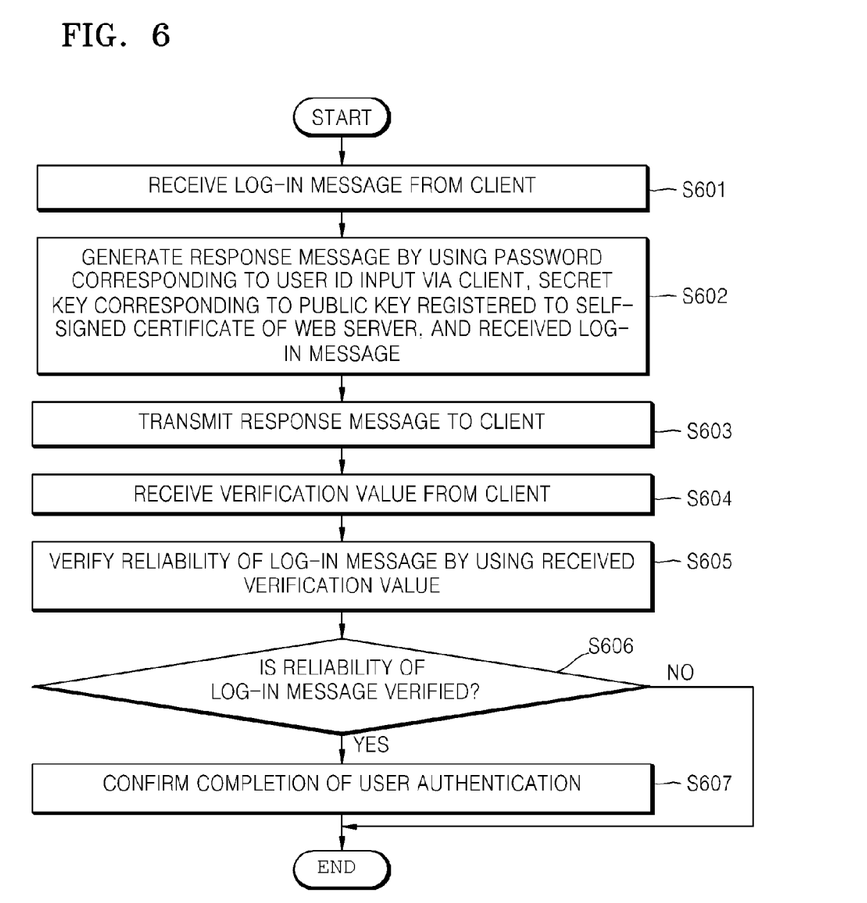
Figure 7:
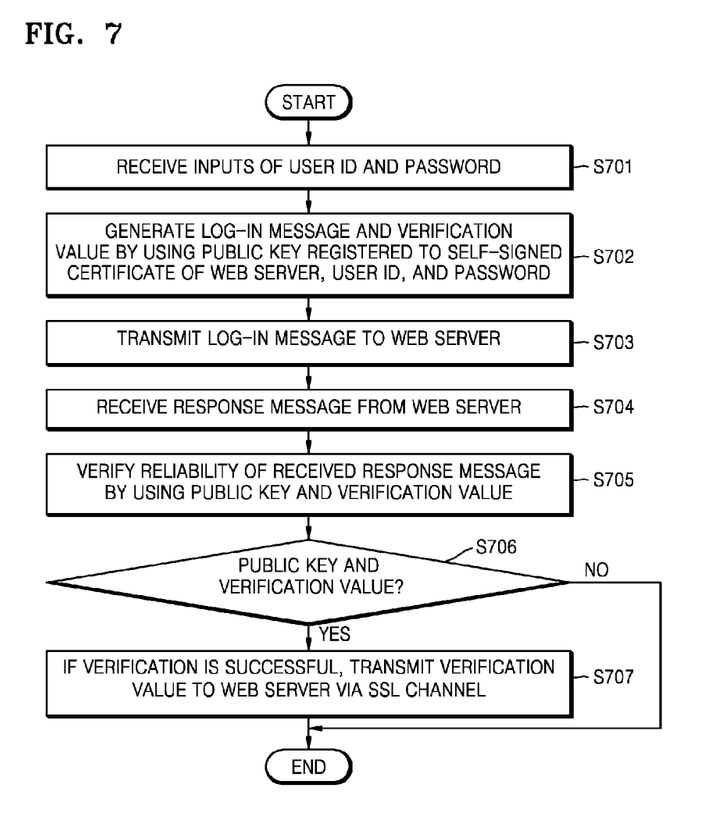

FIGS. 5 through 7 are flowcharts for describing the user authentication method using a self-signed certificate of a web server, according to an embodiment. Hereinafter, the user authentication using a self-signed certificate of a web server according to an embodiment will be described in detail with reference to FIGS. 5 through 7. However, since the methods of generating a log-in message and a response message are described above in detail with reference to FIGS. 2 through 4, detailed descriptions thereof will be omitted below.

The flowchart shown in FIG. 5 includes operations of a user authentication method according to an embodiment, the operations performed by an entire system including a client device and a web server. Referring to FIG. 5, user authentication information, that is, a user ID and a password are input via the client device in operation S501. In operation S502, the client device generates a log-in message and a verification value by using a public key registered to a self-signed certificate of the web server, the user ID, and the password. In operation S503, the client device transmits the log-in message generated in operation S502 to the web server. Here, the log-in message may be transmitted via an HTTP request.

In operation S504, the web server generates a response message by using a password corresponding to the user ID input in operation S501, a secret key corresponding to the public key registered to the self-signed certificate of the web server, and the received log-in message. In operation S505, the web server transmits the response message generated in operation S504 to the client device. Here, the response message may be transmitted via an HTTP request.

In operation S506, the client device verifies a reliability of the received response message by using the public key registered to the self-signed certificate of the web server and the verification value generated in operation S502. It is determined whether the reliability of the response message is verified in operation S507. If the reliability of the response message is verified, the user authentication process proceeds to operation S508. If the reliability of the response message is not verified, the user authentication process is terminated.

In operation S508, the client device transmits the verification value generated in operation S502 to the web server via a SSL channel connected by using the self-signed certificate of the web server. In operation S509, the web server verifies a reliability of the log-in message received in operation S503 by using the received verification value. It is determined whether the reliability of the log-in message is verified in operation S510. If reliability of the log-in message is verified, the user authentication process proceeds to operation S511. If reliability of the log-in message is not verified, the user authentication process is terminated. In operation S511, completion of user authentication is confirmed and the user authentication process is terminated.

The flowchart shown in FIG. 6 includes operations of a user authentication method according to an embodiment, the operations performed by a web server. Referring to FIG. 6, the web server receives a log-in message from a client device in operation S601. Here, the log-in message is generated by using a public key registered to a self-signed certificate of the web server. Furthermore, at this point, the log-in message may be received via an HTTP request.

Next, in operation S602, a response message is generated by using a password corresponding to the user ID input to the client device, a secret key corresponding to the public key registered to the self-signed certificate of the web server, and the log-in message received in operation S501. The generated response message is transmitted to the client device in operation S603. Here, the response message may be transmitted via an HTTP request.

When reliability of the response message is verified at the client device, a verification value is received from the client device in operation S604. Here, the verification value may be received via a SSL channel connected by using the self-signed certificate of the web server. Next, in operation S605, reliability of the log-in message received in operation S601 is verified by using the received verification value. It is determined whether the reliability of the log-in message is verified in operation S606. If reliability of the log-in message is verified, the user authentication process proceeds to operation S607. If reliability of the log-in message is not verified, the user authentication process is terminated. In operation S607, completion of user authentication is confirmed and the user authentication process is terminated.

The flowchart shown in FIG. 7 includes operations of a user authentication method according to an embodiment, the operations performed by a client device. Referring to FIG. 7, a user authentication process is initiated as a user inputs user authentication information, that is, a user ID and a password in operation S701. In operation S702, a log-in message and a verification value are generated by using a public key registered to the self-signed certificate of a web server and the user ID and the password input in operation S701.

Next, in operation S703, the log-in message generated in operation S702 is transmitted to the web server, and a response message is received from the web server in operation S704. The transmission and reception of the log-in message and the response message may be performed via HTTP requests. Furthermore, the response message is generated by the web server by using a password corresponding to the user ID input in operation S701, a secret key corresponding to the public key registered to the self-signed certificate of the web server, and the log-in message generated in operation S702.

In operation S705, reliability of the received response message is verified by using the public key registered to the self-signed certificate of the web server and the verification value generated in operation S702. It is determined whether the reliability of the response message is verified in operation S706. If the reliability of the response message is verified, the user authentication process proceeds to operation S707. Otherwise, if the reliability of the response message is not verified, the user authentication process is terminated.

In operation S707, the verification value generated in operation S702 is transmitted to the web server via an SSL channel connected by using the self-signed certificate of the web server, and the user authentication process is terminated.

As described above, since a log-in message and a response message corresponding thereto are generated by using a self-signed certificate of a web server and a verification value is transmitted via an SSL channel connected by using the self-signed certificate of the web server when the reliability of the response message is verified, a client device and the web server may perform a user authentication safely without sharing keys.

Furthermore, user authentication may be safely performed via an HTTP protocol based on a user ID and a password by using a self-signed certificate of a web server without using a certificate issued by a certificate authority.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While a few embodiments have been particularly shown and described, it will be understood by those of ordinary skill in the art that various changes in form and details may be made to these embodiments without departing from the spirit and scope of the present disclosure as defined by the following claims and their equivalents.

What is claimed is:

1. A user authentication method using a self-signed certificate of a web server, the user authentication method comprising:
    receiving a log-in message generated by using a public key registered to the self-signed certificate of the web server from a client device;
    generating a response message by using the log-in message and a secret key corresponding to the public key using at least one processor;
    transmitting the generated response message to the client device;
    receiving a verification value from the client device via a secure socket layer (SSL) channel connected by using the self-signed certificate of the web server from the client device when a reliability of the response message is verified at the client device;
    verifying a reliability of the log-in message by using the received verification value; and
    confirming completion of user authentication if the reliability of the log-in message is verified.

2. The user authentication method of claim 1, wherein the log-in message is generated by using the public key and a user ID and a password input via the client device.

3. The user authentication method of claim 2, wherein the generating of the response message comprises:
    extracting a password registered to the web server in correspondence to the user ID;
    selecting an arbitrary secret value; and
    generating the response message by using the extracted password, the secret key, the secret value, and the log-in message.

4. The user authentication method of claim 1, wherein the response message is transmitted via an HTTP request.

5. A user authentication method using a self-signed certificate of a web server, the user authentication method comprising:
    receiving inputs of a user ID and a password;
    generating, using at least one processor, a log-in message and a verification value by using a public key registered to the self-signed certificate of the web server, the user ID and the password;
    transmitting the generated log-in message to the web server;
    receiving a response message from the web server;
    verifying a reliability of the response message by using the public key and the verification value; and
    transmitting the verification value to the web server via a secure socket layer (SSL) channel connected by using the self-signed certificate of the web server if a reliability of the response message is verified.

6. The user authentication method of claim 5, wherein the response message is generated by using the log-in message and a secret key corresponding to the public key.

7. The user authentication method of claim 6, wherein the generating of the log-in message comprises:
    obtaining a public key registered to the self-signed certificate;
    selecting an arbitrary secret value;
    selecting an arbitrary Rivest-Shamir-Adlerman (RSA) key pair; and
    generating the log-in message by using the public key, the secret value, the RSA key pair, the user ID, and the password.

8. The user authentication method of claim 5, wherein the log-in message is transmitted via an HTTP request.

9. A user authentication method using a self-signed certificate of a web server, the user authentication method comprising:
- an operation in which a client device receives inputs of a user ID and a password;
- an operation in which the client device generates a log-in message and a verification value by using a public key registered to the self-signed certificate of the web server, the user ID and the password;
- an operation in which the client device transmits the generated log-in message to the web server;
- an operation in which the web server generates a response message by using the log-in message and a secret key corresponding to the public key;
- an operation in which the web server transmits the generated response message to the client device;
- an operation in which the client device verifies a reliability of the response message by using the public key and the verification value;
- an operation in which, when the reliability of the response message is verified, the client device transmits the verification value to the web server via a secure socket layer (SSL) channel connected by using the self-signed certificate of the web server;
- an operation in which the web server verifies a reliability of the log-in message by using the verification value; and
- an operation in which the web server confirms completion of user authentication if a reliability of the log-in message is verified,
- wherein at least one operation uses at least one processor.

10. The user authentication method of claim 9, wherein the generating of the log-in message comprises:
- obtaining a public key registered to the self-signed certificate;
- selecting an arbitrary secret value;
- selecting an arbitrary Rivest-Shamir-Adlerman (RSA) key pair; and
- generating the log-in message by using the public key, the secret value, the RSA key pair, the user ID, and the password.

11. The user authentication method of claim 9, wherein the generating of the response message comprises:
- extracting a password registered to the web server in correspondence to the user ID input via the client device;
- selecting an arbitrary secret value; and
- generating the response message by using the extracted password, the secret value, the secret key and the log-in message.

12. The user authentication method of claim 9, wherein the log-in message is transmitted via an HTTP request, and the response message is transmitted via the HTTP request.

13. An electronic device having a web server, the electronic device comprising:
- a communication interface to communicate with a client device;
- a certificate generator to generate a self-signed certificate;
- a response message generator to generate a response message by using a secret key corresponding to a public key registered to the self-signed certificate in response to a log-in message received from the client device;
- a user authenticator to verify a reliability of the log-in message by using a verification value received from the client device via a secure socket layer (SSL) channel connected by using the self-signed certificate of the web server;
- a storage to store user authentication information; and
- a controller to control a user authentication process,
- wherein, when the log-in message is received from the client device via the communication interface unit, the control unit transmits a response message generated by the response message generator to the client device.

14. The electronic device of claim 13, wherein the log-in message is generated by using the public key registered to the self-signed certificate of the web server and the user ID and the password input via the client device.

15. The electronic device of claim 14, wherein the response message generator extracts a password from the storage in correspondence to the user ID input via the client device, selects an arbitrary secret value, and generates the response message by using the extracted password, the selected secret value, the secret key, and the log-in message.

16. The electronic device of claim 13, wherein the controller transmits the response message to the client device via an HTTP request.

17. A client device comprising:
- a communication interface to communicate with a web server;
- a user authentication information inputting unit to receive inputs of a user ID and a password from a user;
- a security unit to obtain a public key registered to a self-signed certificate of the web server;
- a log-in message generator to generate a log-in message by using the public key obtained by the security unit and the user ID and the password input via the user authentication information inputting unit;
- a verification value generator to generate a verification value by using the public key obtained by the security unit and the user ID and the password input via the user authentication information inputting unit;
- a response verifier to verify a reliability of a response message received from the web server; and
- a controller to control a user authentication process,
- wherein the controller transmits the log-in message to the web server via the communication interface, and, when a reliability of the response message is verified, transmits a verification value generated by the verification value generator to the web server via a secure socket layer (SSL) channel connected by using the self-signed certificate of the web server.

18. The client device of claim 17, wherein the response message is generated by using the log-in message and a secret key corresponding to the public key.

19. The client device of claim 18, wherein the log-in message generator obtains the public key from the self-signed certificate of the web server, selects an arbitrary secret value and an arbitrary Rivest-Shamir-Adlerman (RSA) key pair, and generates the log-in message by using the public key, the secret value, the RSA key pair, the user ID, and the password.

20. The client device of claim 17, wherein the controller transmits the log-in message to the web server via an HTTP request.

21. At least one computer readable medium storing computer readable instructions that control at least one processor to implement a user authentication method using a self-signed certificate of a web server, the method comprising:
- receiving a log-in message generated by using a public key registered to the self-signed certificate of the web server from a client device;
- generating a response message by using the log-in message and a secret key corresponding to the public key using at least one processor;
- transmitting the generated response message to the client device;

receiving a verification value from the client device via a secure socket layer (SSL) channel connected by using the self-signed certificate of the web server from the client device when a reliability of the response message is verified at the client device;

verifying a reliability of the log-in message by using the received verification value; and confirming completion of user authentication if the reliability of the log-in message is verified.

22. At least one computer readable medium storing computer readable instructions that control at least one processor to implement a user authentication method using a self-signed certificate of a web server, the method comprising:

receiving inputs of a user ID and a password;

generating, using at least one processor, a log-in message and a verification value by using a public key registered to the self-signed certificate of the web server, the user ID and the password;

transmitting the generated log-in message to the web server;

receiving a response message from the web server;

verifying a reliability of the response message by using the public key and the verification value; and transmitting the verification value to the web server via a secure socket layer (SSL) channel connected by using the self-signed certificate of the web server if a reliability of the response message is verified.

23. At least one computer readable medium storing computer readable instructions that control at least one processor to implement a user authentication method using a self-signed certificate of a web server, the method comprising:

an operation in which a client device receives inputs of a user ID and a password;

an operation in which the client device generates a log-in message and a verification value by using a public key registered to the self-signed certificate of the web server, the user ID and the password;

an operation in which the client device transmits the generated log-in message to the web server;

an operation in which the web server generates a response message by using the log-in message and a secret key corresponding to the public key;

an operation in which the web server transmits the generated response message to the client device;

an operation in which the client device verifies a reliability of the response message by using the public key and the verification value;

an operation in which, when the reliability of the response message is verified, the client device transmits the verification value to the web server via a secure socket layer (SSL) channel connected by using the self-signed certificate of the web server;

an operation in which the web server verifies a reliability of the log-in message by using the verification value; and an operation in which the web server confirms completion of user authentication if a reliability of the log-in message is verified, wherein at least one operation uses at least one processor.

* * * * *

UNITED STATES PATENT AND TRADEMARK OFFICE
CERTIFICATE OF CORRECTION

PATENT NO. : 9,178,870 B2  
APPLICATION NO. : 13/948524  
DATED : November 3, 2015  
INVENTOR(S) : Hyun Sook Rhee Page 1 of 1

It is certified that error appears in the above-identified patent and that said Letters Patent is hereby corrected as shown below:

IN THE CLAIMS

Claim 7, Column 8, Line 61

Delete "Adlerman" and insert --Adleman--, therefor.

Claim 10, Column 9, Line 36

Delete "Adlerman" and insert --Adleman--, therefor.

Claim 19, Column 10, Line 50

Delete "Adlerman" and insert --Adleman--, therefor.

Signed and Sealed this
Second Day of August, 2016

Michelle K. Lee
*Director of the United States Patent and Trademark Office*